(12) United States Patent
Sindalovsky

(10) Patent No.: US 6,745,265 B1
(45) Date of Patent: Jun. 1, 2004

(54) METHOD AND APPARATUS FOR GENERATING STATUS FLAGS IN A MEMORY DEVICE

(75) Inventor: Vladimir Sindalovsky, Perkasie, PA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/531,368

(22) Filed: Mar. 21, 2000

(51) Int. Cl.[7] .................................................. G06F 3/00
(52) U.S. Cl. ........................ 710/57; 711/156; 711/166; 710/56; 710/58; 710/60; 370/229; 370/422
(58) Field of Search .......................... 711/156, 163, 711/147, 166; 370/422, 229; 710/56, 57, 58, 60

(56) References Cited

U.S. PATENT DOCUMENTS

| | | | |
|---|---|---|---|
| 4,888,739 A | 12/1989 | Frederick et al. | 365/221 |
| 4,891,788 A | 1/1990 | Kreifels | 365/49 |
| 5,021,994 A * | 6/1991 | Tai et al. | 365/220 |
| 5,084,841 A | 1/1992 | Williams et al. | 365/189.07 |
| 5,097,442 A * | 3/1992 | Ward et al. | 365/78 |
| 5,267,191 A * | 11/1993 | Simpson | 365/78 |
| 5,365,485 A | 11/1994 | Ward et al. | 365/221 |
| 5,381,126 A | 1/1995 | McClure | 340/146.2 |
| 5,426,756 A * | 6/1995 | Shyi et al. | 395/425 |
| 5,473,756 A | 12/1995 | Traylor | 395/250 |
| 5,508,679 A | 4/1996 | McClure | 340/146.2 |
| 5,687,348 A | 11/1997 | Whittaker | 395/460 |
| 5,696,940 A | 12/1997 | Liu et al. | 395/481 |
| 5,721,726 A | 2/1998 | Kurnick et al. | 370/236 |
| 5,850,568 A | 12/1998 | Hawkins et al. | 395/877 |
| 5,852,748 A | 12/1998 | Hawkins et al. | 395/874 |
| 5,931,926 A | 8/1999 | Yeung et al. | 710/52 |
| 5,955,897 A | 9/1999 | Narayana et al. | 326/105 |
| 5,987,507 A * | 11/1999 | Creedon et al. | 709/215 |
| 6,101,329 A * | 8/2000 | Graef | 365/221 |
| 6,167,054 A * | 12/2000 | Simmons et al. | 370/422 |
| 6,192,028 B1 * | 2/2001 | Simmons et al. | 370/229 |
| 6,263,410 B1 * | 7/2001 | Kao et al. | 710/57 |
| 6,272,452 B1 * | 8/2001 | Wu et al. | 703/24 |

* cited by examiner

Primary Examiner—Mano Padmanabhan
Assistant Examiner—Jasmine Song

(57) ABSTRACT

A FIFO is provided which includes gray-encoded READ and WRITE counters in which partial capacity flags (referred to collectively as "WATERMARK level" flags herein) are generated when the difference between the count values in the two counters exceeds a first threshold level and which resets the flag when the difference between the count values drops below a second, lower threshold level. In accordance with the present invention, a single gray-coded WRITE pointer counter comprises a WRITE pointer register and a gray-code increment block. A READ pointer register comprises a shift register and a gray code increment block having plural stages and storing consecutive incremental WATERMARK values, based on the READ pulse count, therein. With each successive READ clock pulse, consecutive WATERMARK values are stored in the plural-stage READ pointer register, and with each READ clock pulse these values are incremented by one. The plural WATERMARK values are compared with the current value of the WRITE pointer register. By analyzing the current WRITE pointer value in connection with the plural consecutive WATERMARK values, the direction (ascending or descending) of the compared values can be determined and, due to the redundancy available from the multi-level WATERMARK values stored in the READ pointer register, hystersis is introduced so that the partial capacity flags are generated only when the difference between the READ and WRITE pulses crosses the WATERMARK level.

11 Claims, 5 Drawing Sheets

FIG. 3

| BIT COUNT | BINARY | DECIMAL | BIT COUNT | BINARY | DECIMAL |
|---|---|---|---|---|---|
| 1 | 000000 | 0 | 33 | 101110 | 46 |
| 2 | 000001 | 1 | 34 | 101010 | 42 |
| 3 | 000011 | 3 | 35 | 101011 | 43 |
| 4 | 000010 | 2 | 36 | 101001 | 41 |
| 5 | 000110 | 6 | 37 | 101000 | 40 |
| 6 | 000111 | 7 | 38 | 101100 | 44 |
| 7 | 000101 | 5 | 39 | 101101 | 45 |
| 8 | 001101 | 13 | 40 | 100101 | 37 |
| 9 | 001100 | 12 | 41 | 100111 | 39 |
| 10 | 001000 | 8 | 42 | 100110 | 38 |
| 11 | 001001 | 9 | 43 | 100010 | 34 |
| 12 | 001011 | 11 | 44 | 100011 | 35 |
| 13 | 001010 | 10 | 45 | 100001 | 33 |
| 14 | 001110 | 14 | 46 | 100000 | 32 |
| 15 | 001111 | 15 | 47 | 110000 | 48 |
| 16 | 011111 | 31 | 48 | 110001 | 49 |
| 17 | 011110 | 30 | 49 | 110011 | 51 |
| 18 | 011010 | 26 | 50 | 110010 | 50 |
| 19 | 011011 | 27 | 51 | 110110 | 54 |
| 20 | 011001 | 25 | 52 | 110111 | 55 |
| 21 | 011000 | 24 | 53 | 110101 | 53 |
| 22 | 011100 | 28 | 54 | 110100 | 52 |
| 23 | 011101 | 29 | 55 | 100100 | 36 |
| 24 | 111101 | 61 | 56 | 000100 | 4 |
| 25 | 111100 | 60 | 57 | 010100 | 20 |
| 26 | 111000 | 56 | 58 | 010101 | 21 |
| 27 | 111001 | 57 | 59 | 010111 | 23 |
| 28 | 111011 | 59 | 60 | 010110 | 22 |
| 29 | 111010 | 58 | 61 | 010010 | 18 |
| 30 | 111110 | 62 | 62 | 010011 | 19 |
| 31 | 111111 | 63 | 63 | 010001 | 17 |
| 32 | 101111 | 47 | 64 | 010000 | 16 |

METHOD AND APPARATUS FOR GENERATING STATUS FLAGS IN A MEMORY DEVICE

TECHNICAL FIELD OF THE INVENTION

This invention relates in general to the asynchronous transmission of digital signals, and more particularly relates to a First-In-First-Out (FIFO) buffer in which a historical trend of the direction (ascending or descending) of change of the difference between counted READ clock pulses and counted WRITE clock pulses is developed to generate buffer capacity information.

BACKGROUND OF THE INVENTION

First-In-First-Out (FIFO) buffer memories are dual port memories having characteristics which are highly useful in many applications. In particular, such memories allow the writing of data to the memory and the reading of data from the memory simultaneously, and at independent rates limited only by the speed capability of the memory itself and devices to which the FIFO is connected.

By way of example, a typical system utilizing FIFO buffers is a computer system in which a CPU is connected to a keyboard, a monitor, a printer, a memory storage device, a modem, and a network. In transmitting data from one piece of equipment to another, such transmission often requires communication between extremely fast operating equipment such as the CPU, and other slower operating equipment such as storage devices and printers.

The most efficient use of such a system is realized when the various interconnected components of the system can communicate asynchronously, so that the fast operating equipment is not slowed down by the slower operation of the peripheral equipment. Thus, FIFO memories are utilized between the components for storing data written thereto by a first piece of equipment at one speed and read therefrom by destination equipment at another speed.

Since asynchronous FIFO's are simultaneously performing both READ and WRITE operations, the available space in the FIFO is constantly changing. When the speed of the WRITE operation, which adds data to the FIFO, exceeds the speed of the READ operation, which retrieves data from the FIFO, the available space in the FIFO gradually decreases in proportion to the difference in speed of the WRITE and READ clock signals which clock the data in and out of the FIFO. Conversely, when the speed of the READ operation exceeds that of the WRITE operation, the available space in the FIFO gradually increases, again in proportion to the difference in speed of the READ and WRITE clock signals.

For such a system to function properly, it is necessary that real-time knowledge of the capacity status of the FIFO be available at all times. For example, when the buffer is full, the equipment transmitting data to the buffer should be signaled so that further transmission cannot be accomplished until memory storage space again becomes available. Likewise, the destination equipment should be signaled by the buffer when the memory storage is empty so that further reading of the buffer is not attempted until additional data has been written to the buffer by the transmitting equipment. If an attempt is made to write data to a full FIFO, the data is usually ignored; if an attempt is made to read data from an empty FIFO, the last block of valid data is usually reread. Each of these results is undesirable and can cause delay and/or data errors.

To accomplish the above-described signaling function, asynchronous FIFO buffers are typically equipped with status flag circuitry to detect and signal various degrees of fullness of the buffer array, e.g., to generate EMPTY flags, FULL flags, HALF-FULL flags, and flags indicating other various fractions of the total memory capacity (partial-capacity flags). The partial-capacity flags may serve to signal to a device that the READ or WRITE operation speed should be increased or decreased, if possible.

Many of these systems use binary counters connected to READ and WRITE clocks which are also connected to binary adders and subtractors. The binary adders or subtractors detect the differences between the READ and WRITE pointer levels as the clock pulses from the READ and WRITE clocks are counted. These counters generate the status flags in a known manner to facilitate the smooth operation of the reading and writing process.

Because of the use of the binary adders and subtractors, and therefore the use of binary code, glitches can occur as the binary code switches from one value to another. For example, in order to switch from a binary 7 (0111) to a binary 8 (1000), all four of the digits in the binary number must change state. As the number of state-changes increases, so does the likelihood for the occurrence of glitches, since the actual switching cannot occur simultaneously. These glitches may lead to the generation of a false flag. Since the READ and WRITE clocking occurs asynchronously, no reliable glitch filtering exists in the prior art.

In an effort to reduce the potential for glitching, methods have been developed for determining the empty/full status of a FIFO memory which utilize "gray coding." Gray-code refers to a system of binary numbers in which only one of the bits is different between any two consecutive numbers. Basically, the binary numbers are placed in sequence based on an order which assures that, from one digit to the next, only one bit changes state, disregarding their decimal order. Thus, in a gray-code counter, only one bit changes state due to any increment or decrement of a counter. This ensures that any errors or glitches occurring in calculation of the EMPTY or FULL flags will be less than or equal to one. Examples of such gray-code FIFO memories can be found in U.S. Pat. Nos. 5,084,841 and 5,426,756, both of which are incorporated herein fully by reference.

While known gray-code pointer counters reduce the glitching associated with changes in the counter state, they still require additions and/or subtractions to be performed in order to calculate the "partially full" or "partially empty" states. For example, in U.S. Pat. No. 5,084,841, multiple gray-code counters are utilized for each partially-full state so that, based on a Full-state value F, a lesser value F–N can be determined, where N is a number selected by the user to represent an amount below FULL at which a partially-full flag will be set. In this scenario, a first gray-code counter is required to calculate the FULL state and a second gray-code counter is required to indicate the FULL-N state. This requires additional hardware, increasing the expense of the circuit and the size of the circuit. Further, none of the prior art gray-code FIFOs compensate for gray-coding errors which may occur at and around the partial capacity flags.

Thus, there is a need for a FIFO that can generate an "ALMOST FULL" and/or "ALMOST EMPTY" flag, compensate for gray-code switching errors, and reduce the hardware needed for implementation.

SUMMARY OF THE INVENTION

The present invention addresses the needs of the prior art by providing a FIFO which includes gray-encoded READ and WRITE counters in which ALMOST FULL and/or ALMOST EMPTY (referred to collectively as "WATERMARK level" herein) flags are generated when the difference between the count values in the two counters exceeds a first threshold level and which resets the flag when the difference between the count values drops below a second, lower threshold level. In accordance with the present invention, a single gray-coded WRITE pointer counter comprises a WRITE pointer register and a gray-code increment block. A READ pointer register comprises a shift register and a gray code increment block having plural stages and storing consecutive incremental WATERMARK values, based on the READ pulse count, therein. With each successive READ clock pulse, consecutive WATERMARK values are stored in the plural-stage READ pointer register, and with each READ clock pulse these values are incremented by one. The plural WATERMARK values are compared with the current value of the WRITE pointer register. By analyzing the current WRITE pointer value in connection with the plural consecutive WATERMARK values, the direction (ascending or descending) of the compared values can be determined and, due to the redundancy available from the multi-level WATERMARK values stored in the READ pointer register, hystersis is introduced so that the ALMOST FULL or ALMOST EMPTY flags are generated only when the difference between the READ and WRITE pulses crosses the WATERMARK level.

BRIEF DESCRIPTION OF THE DRAWINGS

FIG. 3 is a table illustrating the correspondence between gray-code binary numbers and decimal numbers;

DETAILED DESCRIPTION

Figure 1:
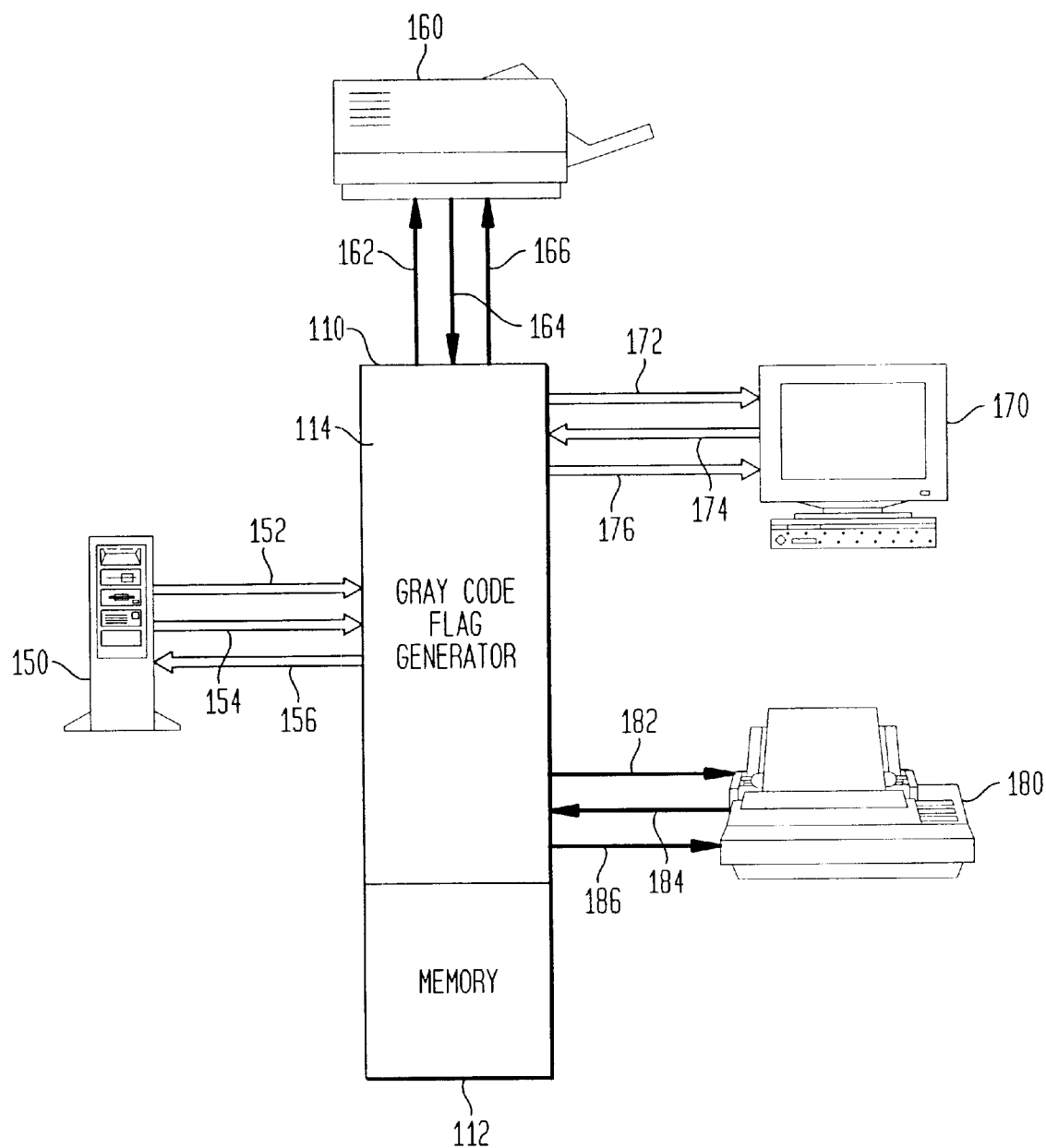
FIG. 1 illustrates an example of an environment in which the FIFO buffer of the present invention might be used.

FIG. 1 illustrates an example of an environment in which the FIFO buffer of the present invention might be utilized. The FIFO buffer 110 of the present invention includes a memory block 112 and a gray-encoded flag generation block 114. A central processing unit (CPU) 150 communicates with peripheral devices such as laser printer 160, monitor 170, and dot matrix printer 180 via the FIFO buffer 110. The general flow of data in FIG. 1 is from the CPU 150 to the peripheral devices. In this example shown in FIG. 1, CPU 150 and laser printer 160 comprise high speed devices capable of high transmission rates (e.g. exceeding 9600 bits per second) while monitor 170 and dot matrix printer 180 comprise relatively slow speed devices which are capable of transmission rates of, for example, less than 1200 bits per second.

In view of the diverse transmission speed capabilities of the various devices, FIFO buffer 110, through memory block 112, provides an intermediate storage area for data being transmitted through the system. For example, when the transmission rate of CPU 150 exceeds the receive rate of monitor 170, the data in excess of that which monitor 170 can read is temporarily stored in memory section 112 of data buffer 110.

To accomplish the flow of data and the signaling functions of the present invention, each peripheral device is connected to FIFO buffer 110 via a plurality of buses. For example, data bus 152 provides a data input to FIFO buffer 110, while WRITE clock bus 154 provides a path for a clock signal which clocks the data transmitted along data input bus 152 into data buffer 110 in a known manner. A capacity-status flag bus 156 provides a path from FIFO buffer 110 to CPU 150 for the above-described signal flags to be transmitted to CPU 150.

Similar buses are provided on the output side of FIFO buffer 110. Laser printer 160 is connected to FIFO buffer 110 via data output bus 162, providing a path for data to flow from FIFO buffer 110 to laser printer 160. A READ clock bus 164 provides a path for a READ clocking signal from laser printer 160 which clocks FIFO memory 110 to send data to the laser printer 160 via bus 162. Finally, status flag bus 166 provides a path for status information regarding the buffer memory to be conveyed to laser printer 160. Similar connections 172, 174 and 176, respectively, (monitor 170), and 182, 184 and 186, respectively, (dot matrix printer 180) provide transmission paths for the remaining peripherals.

Figure 2:
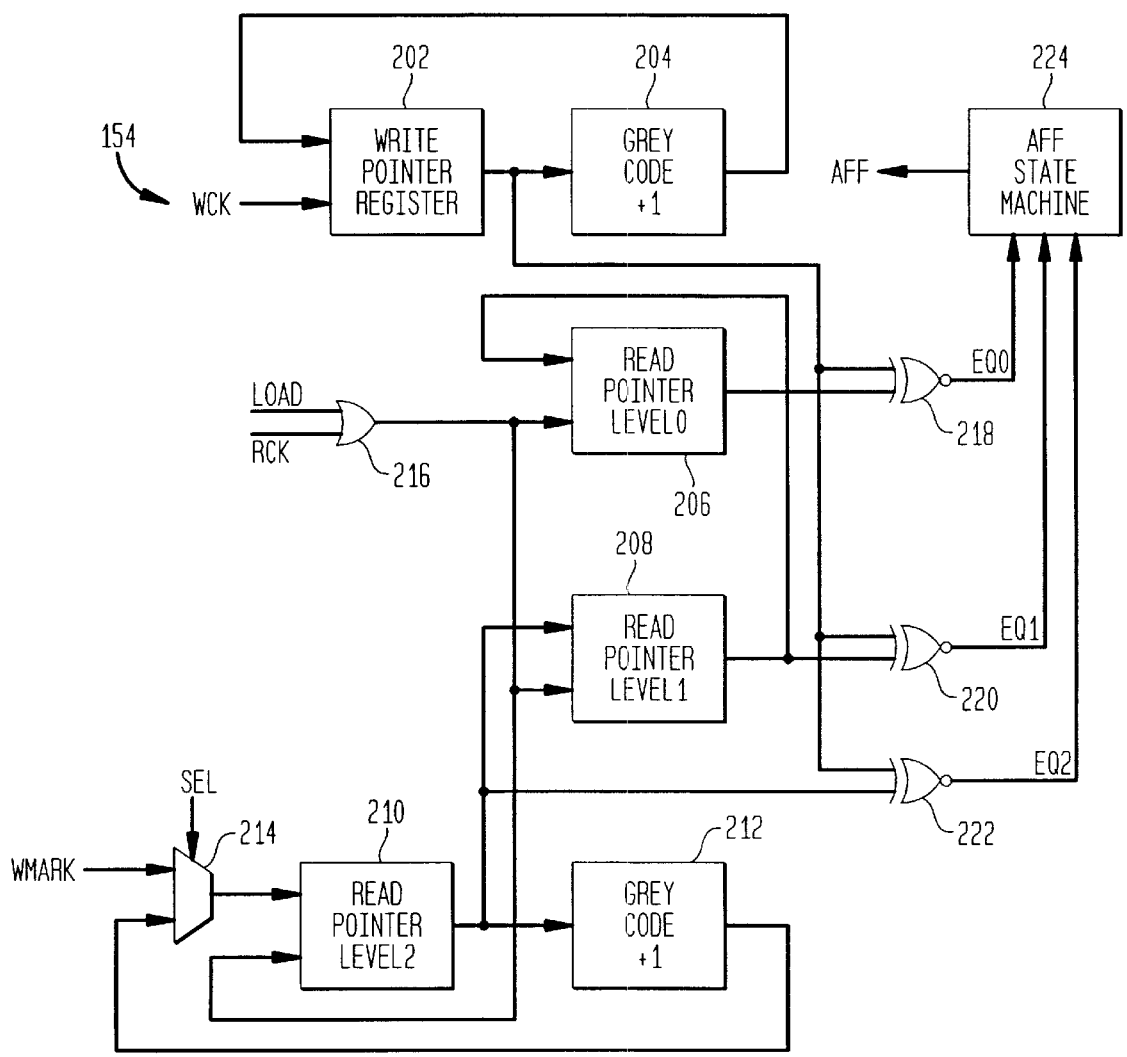
FIG. 2 illustrates a block diagram of an example of the gray-encoded flag generator of FIG. 1.

FIG. 2 illustrates a block diagram of an example of the gray-encoded flag generator 114 of FIFO buffer 110. A WRITE pointer register 202 and gray code increment block 204 comprise a gray code WRITE pointer counter. The WRITE clock input WCK receives the WRITE clock signal via bus 154 of FIG. 1.

A READ pointer counter comprises READ pointer registers 206, 208, and 210; gray code increment block 212; and multiplexer 214. An OR gate 216 provides selective delivery of a load pulse or a READ clock pulse to READ pointer registers 206, 208 and 210.

A bank of three exclusive-NOR gates 218, 220, and 222 are connected to the outputs of READ pointer registers 206, 208, and 210, respectively. In addition, the output of WRITE pointer register 202 is connected to the inputs of each of exclusive-NOR gates 218, 220, and 222. The outputs of each of the exclusive-NOR gates 218, 220, and 222 are connected to inputs of a state machine 224. As described in more detail below, state machine 224 generates flags indicating the capacity of memory 112 at the appropriate times, based upon the outputs of exclusive-NOR gates 218, 220 and 222.

The functionality of gray code flag generator 110 is described herein with respect to generation of an ALMOST FULL flag; however, it is understood that one of ordinary skill in the art can, using the principles set forth herein, easily program the state machine 224 to generate an ALMOST EMPTY flag or any other flag indicative of a partially full or partially empty state. The gray code flag generator 110 of the present invention operates as follows. First, a system reset signal generated globally on power-up resets all registers and counters to zero in a known manner. The WATERMARK level is set after the system reset occurs by assigning a desired gray-encoded level to the WMARK input of multiplexer 214. With the SEL level set to high, a first load pulse is input to the READ pointer registers 206, 208, and 210 via OR gate 216. On the first LOAD pulse, the WATERMARK level is loaded into READ pointer register 210. The SEL input is then switched to low to allow for the WATERMARK to be incremented on subsequent LOAD pulses, and on the second LOAD pulse, the WATERMARK level is shifted into READ pointer register 208, and the WATERMARK level in READ pointer register 210 is incremented by one gray-code level. On the third LOAD pulse, the WATERMARK level is shifted into READ pointer register 206, the incremented-by-one WATERMARK level stored in READ pointer register 210 is shifted to READ pointer register 208, and the incremented-by-one WATERMARK level stored in READ pointer register 210 is again incremented by one (so that it now equals WATERMARK+ 2) and loaded into READ pointer register 210. This process initializes the READ pointer registers 206, 208, and 210 for operation.

Once the initialization process is completed, with each incoming READ clock pulse, the gray-code WATERMARK level in READ pointer register 210 is incremented by one, its previous WATERMARK value is shifted into READ pointer register 208, and the previous WATERMARK value of READ pointer register 208 is shifted into READ pointer register 206. The WATERMARK values of the three READ pointer registers 206, 208, and 210 are compared with the current value of the WRITE pointer register by exclusive-NOR gates 218, 220, and 222, respectively.

Exclusive-NOR gates 218, 220, and 222 each output a low signal when the READ pointer register WATERMARK value that they are comparing is not equal to the WRITE pointer register level. When the comparison of the READ pointer register WATERMARK value and WRITE pointer register level input to one of the exclusive-NOR gates is equal, the exclusive-NOR gate, which senses this equality, outputs a high signal to state machine 224. This indicates that an equality state has been reached with respect to that exclusive-NOR gate; these equality signals are used by the state machine 224 to make a decision on setting or resetting of an appropriate flag.

State machine 224 is a conventional state machine which is programmed to read the time sequencing of the three equality signals. If the order of the equality signals in time is ascending and the ascent occurs across all three equality comparisons, then a flag is activated indicating that the WATERMARK level has been reached and confirmed. If the order of the equality signals in time is descending, and the descent occurs across all three equality comparisons, this causes the state machine to reset the flag.

If for any reason the sequence of the outputs of exclusive-NOR gates 218, 220, and 222 does not satisfy the ascending or descending order test, the state machine keeps the previous value of the flag status; once the proper ascending or descending sequence occurs, however, the flag is set or reset accordingly. Due to the requirement that a specific ascending or descending sequence occur prior to setting or resetting of the flag, the gray-code flag generator illustrated in FIG. 2 has a hystersis of +/−1, thus avoiding excessive flag toggling when the FIFO level is close to the WATERMARK level.

An example of the operation of the gray-code flag generator of FIG. 2 will now be discussed with respect to FIGS. 3 through 5. To simplify this explanation, the correspondence between the gray-code binary numbers and the decimal numbers are shown in the "binary" and "decimal" columns of FIG. 3. For the purpose of this example, the WATERMARK is set to gray-code binary number 000110 (decimal 6, the fifth row of the left-hand column of FIG. 3). Since the WATERMARK corresponds to the fifth row of Table 3, this corresponds to a WATERMARK occurring when 5 or more data words are in the buffer.

The WATERMARK level is selected based upon the difference value between the WRITE and READ pointers at which the user of the system would consider the buffer to be "almost" full. Once this WATERMARK level is established in accordance with the present invention, the number of WRITE and READ pulses are constantly monitored to calculate the number of data words in the buffer at all times. For simplicity of this explanation, we consider the WATERMARK level as being reached when the number of data words stored in the buffer at any given time has reached 5 (in practical application, this would be extremely low; for example, in a 64 bit buffer, it is more likely that the buffer would be considered to be "almost full" when it reaches a level of approximately 60 data words). Since the WATERMARK level is set as 5, and since it has a hystersis of ±1, this means that the ALMOST FULL flag AFF will be set when the WRITE level is six levels or more above the. READ level, and the AFF will be reset when the WRITE level is four levels or less above the READ level. Referring now to FIG. 4, with the WATERMARK level set at 5 (corresponding, as previously mentioned, to gray level binary code 000110, or decimal 6), the load clock is applied with the select signal SEL high choosing WMARK as an input. On the rising edge of this first load pulse, the WATERMARK value 000110 is written into READ pointer register 210, i.e., as shown in FIG. 4, on the first load clock pulse, RPL2 is set to decimal 6. On the falling edge of the load clock, SEL is set to a level choosing gray code +1 as an input to enable incrementing of the gray code. On the second load pulse, the WATERMARK value 000110 (decimal 6) is shifted into READ pointer register 208 (RPL1 is set to decimal 6) and the WATERMARK value of 000110 in READ pointer register 210 is incremented to the next gray code value, 000111 (RPL2 is set to decimal 7). On the last loading pulse, the WATERMARK value 000110 (decimal 6) is shifted into READ pointer register 206 (RPL0 is set to decimal 6), the once-incremented WATERMARK value in READ pointer register 210, 000111, is shifted to READ pointer register 208 (RPL1 is set to decimal 7) and the next gray code WATERMARK value, 000101 (decimal 5), is moved into READ pointer register 210 (RPL2 is set to decimal 5).

At this point the initialization/loading process is completed and now all three WATERMARK values stored in READ pointer registers 206, 208, and 210 will be incremented on each READ clock RCK and compared with the current WRITE pointer WL, which is reset to zero.

Figure 4:
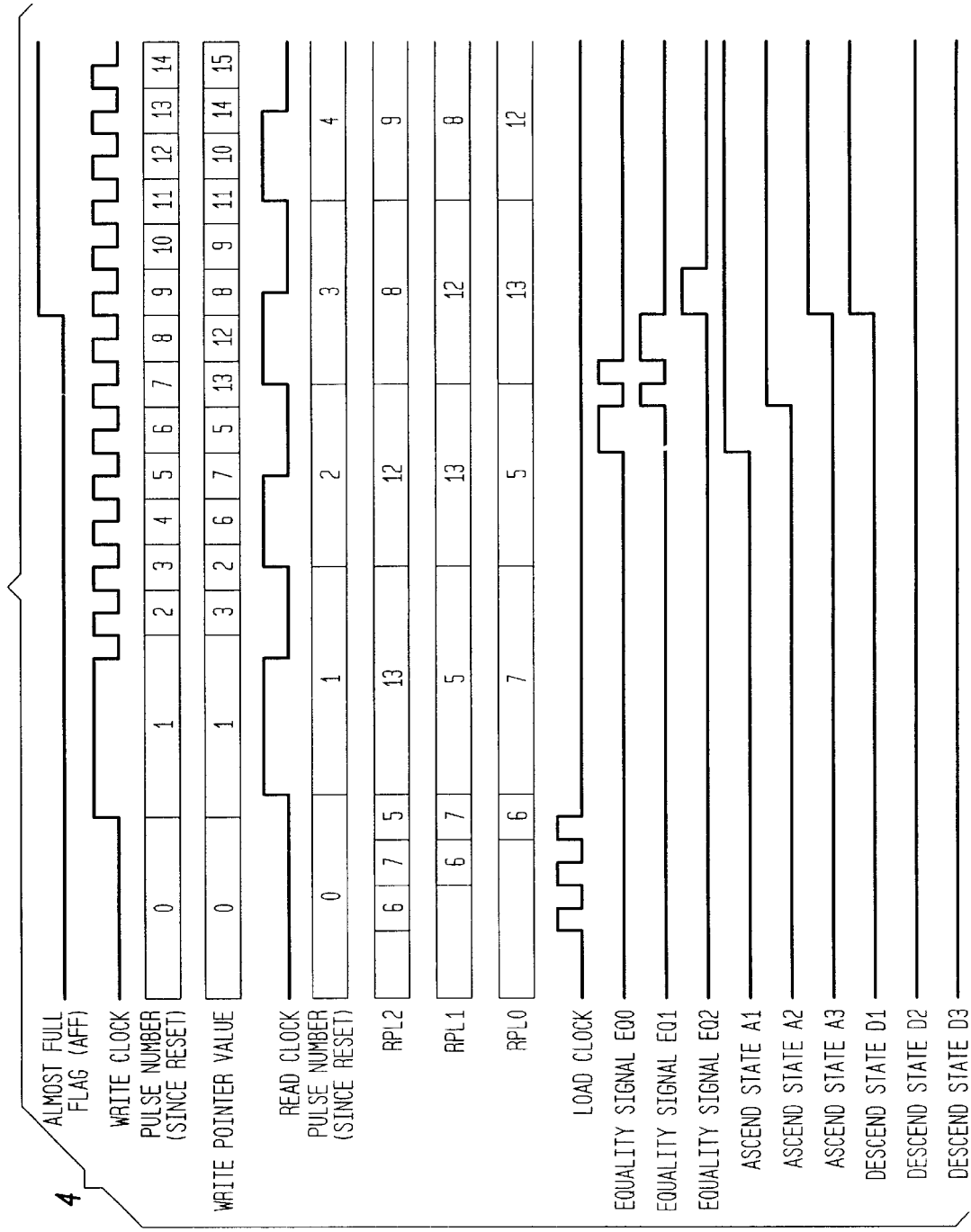
FIG. 4 illustrates a timing drawing showing the timing of the triggering of an ALMOST FULL flag in accordance with the present invention.

As can be seen in FIG. 4, on the first WRITE clock pulse, the WRITE pointer value is incremented to a gray code 000001 (decimal 1). On the first READ clock pulse, RPL2, which was initialized to a gray code 000101 (decimal 5) is incremented by one to gray code 001101 (decimal 13); RPL1, which was initialized to a gray code 000111 (decimal 7) is incremented to 000101 (decimal 5); and RPL0 is incremented from 000110 (decimal 6) to gray code 000111 (decimal 7).

As can be seen in FIG. 4, the WRITE clock is operating at a faster rate than the READ clock; thus, the FIFO will reach the ALMOST FULL (AFF) condition when the WRITE clock gets to a point where it is six cycles ahead of the READ clock. This condition occurs at the beginning of the ninth WRITE clock pulse, which occurs during the middle of the third READ clock pulse (9−3=6). In accordance with the present invention however, before this point is reached, other conditions have to occur before the ALMOST FULL flag AFF is triggered. In accordance with the present invention, the ALMOST FULL flag will not be triggered until it has sensed that the difference between the WRITE clock pulses and the READ clock pulses has ascended from 4, through 5, and then to 6. This assures that a hysteresis is built into the flag generation, avoiding glitches (essentially filtering them out) when the FIFO level is close to the WATERMARK.

At WRITE pulse number 6, the WRITE pointer value switches to 000101 (decimal 5) causing the WRITE pointer value to be equal to RPL0. This equality condition is sensed by exclusive-NOR gate 218 which outputs a high EQ0 signal to the state machine 224. At this point, there have been six WRITE pulses and two READ pulses; thus, the WRITE pointer is four levels higher than the READ pointer. This sets state machine 224 in an "ascend state A1" which simply records the fact that this condition has been reached. WRITE pulse 7 increments the WRITE pointer to 001101 (decimal 13), making the WRITE pointer value equal to RPL1 for a short time. This equality is sensed by exclusive-NOR gate 220 and it outputs a high EQ1 signal to state machine 224 (at the same time, since the WRITE pointer value is no longer equal to RPL0, exclusive-NOR gate 218 switches EQ0 back to a low signal). Almost immediately, however, at READ pulse number 3, RPL2 is switched to 001000 (decimal 8), RPL1 is switched to 001100 (decimal 12), and RPL0 is switched to 001101 (decimal 13). Thus, at this point, exclusive-NOR gate 218 senses the equality between the WRITE pointer value and RPL0 and once again outputs a high EQ0 value (and, since RPL1 has switched to 001100 (decimal 12), EQ1 switches back to low).

At WRITE clock pulse 8, the WRITE pointer value switches to 001100 (decimal 12) causing an equality condition again at exclusive-NOR gate 220. Once again, as can be seen in FIG. 4, the equality signal EQ0 goes to low, the equality signal EQ1 goes to high, and the ascend state A2, which had previously switched to high on the first occurrence of a high EQ1 remains at ascend state 2. At WRITE pulse number 9, the WRITE pointer value changes to 001000 (decimal 8); thus, the WRITE pointer value equals RPL2. Note further, that WRITE clock number 9 is now six pulses ahead of the READ clock pulse 3. Upon the occurrence of this event, equality signal EQ2 goes high, equality signal EQ1 goes low, ascend state A3 is reached and goes high, and state machine 224 issues the ALMOST FULL flag since now all three ascend states A1, A2, and A3 have been reached. In addition, as ascend state A3 goes high, descend state D1 also goes high, thereby setting the first condition for the reverse process for resetting of the AFF flag.

Figure 5:
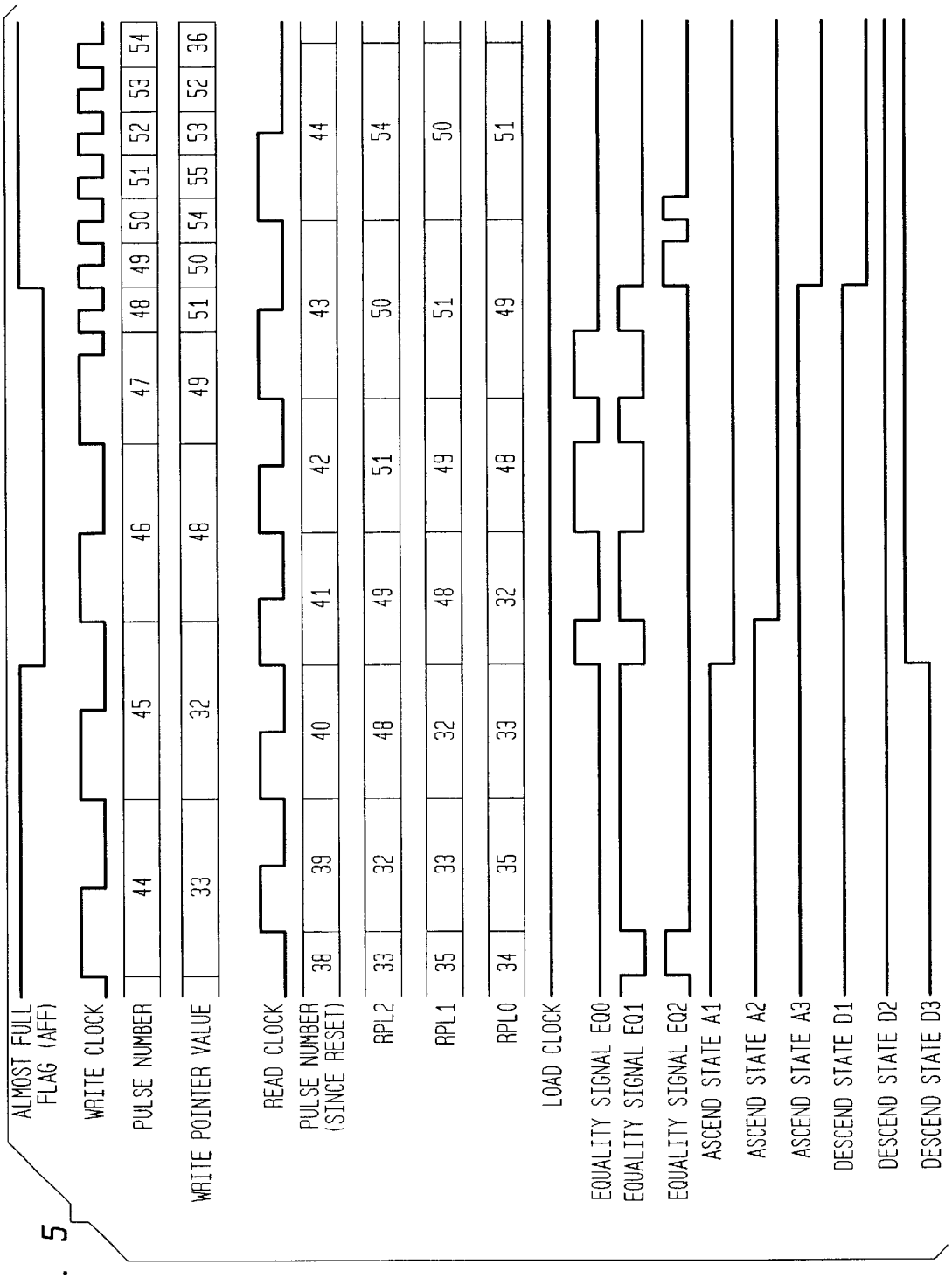
FIG. 5 illustrates a timing diagram showing a reset condition in accordance with the present invention.

Referring to FIG. 5, a reset condition is shown. In this illustration, descend state D1 and descend state D2 have already been reached and are at high levels. At WRITE clock pulse 44, the WRITE pointer value switches to 100001 (decimal 33) resulting in an equality condition with RPL2. This causes equality signal EQ2 to go high (and equality signal EQ1 to go low). At READ pulse number 39, the RPL values are again incremented, switching RPL1 to 100001 (decimal 33) and causing an equality condition between the WRITE pointer value and the RPL1 value, again causing equality signal EQ1 to go high and equality signal EQ2 to drop back to low. The equality signals remain in this condition until WRITE pulse number 41 occurs. At this point, with the incrementing of the WRITE pointers, RPL0 is incremented to 100000 (decimal 32) which is equal at that point to the WRITE pointer value. This triggers the equality signal EQ0 to go high and resets the ALMOST FULL flag AFF (since, at this point, the WRITE pulse number 45 is only four ahead of READ clock pulse 41). This resent condition remains in effect until the occurrence of WRITE pulse number 49, at which point, as can be seen in FIG. 5, the triggering condition of the WRITE pulse being six pulses ahead of the READ pulse and all three ascend conditions going to the same level occurs again.

By requiring the system to sequence through a predefined ascending or descending order, errors resulting from, for example, counting during the incrementing of the pointers, are screened out. Thus, the ALMOST FULL flag will be set or reset correctly, but only after the system has confirmed that the actual WATERMARK level has been achieved. Using the state machine allows the setting or resetting of the ALMOST FULL flag to occur with the hystersis of +/−1 (or any other hysteresis value desired, if additional READ pointer registers are used), thereby avoiding an excessive toggling when the FIFO level is close to the WATERMARK level.

While there has been described herein the principles of the invention, it is to be understood by those skilled in the art that this description is made only by way of example and not as a limitation to the scope of the invention. Accordingly, it is intended by the appending claims, to cover all modifications of the invention which fall within the true spirit and scope of the invention.

I claim:

1. A method of generating capacity status flags in a memory adapted to receive READ and WRITE pulses and to store a WRITE value based on the received WRITE pulses, comprising the steps of:

setting a WATERMARK value at which point said memory is considered to be in a partial capacity state;

incrementing the WATERMARK value on each READ pulse;

incrementing the WRITE value on each WRITE pulse and storing said incremented WRITE value;

continuously comparing the incremented WATERMARK value and the incremented WRITE value; and generating a partial capacity status flag when said incremented WATERMARK value and said incremented WRITE value are equal.

2. A method as set forth in claim 1, wherein said WATERMARK value comprises a value at which said memory is considered to be in an ALMOST FULL state.

3. A method as set forth in claim 1, wherein said WATERMARK value comprises a value at which said memory is considered to be in an ALMOST EMPTY state.

4. A method as set forth in claim 1, wherein said WATERMARK value comprises a value at which said memory is considered to be in a HALF FULL state.

5. A method of generating capacity status flags in a memory adapted to receive READ and WRITE pulses and to store a WRITE value based on the received WRITE pulse, comprising the steps of:

setting a WATERMARK value at which point said memory is considered to be in a partial capacity state;

incrementing the WATERMARK value on each READ pulse and storing the incremented WATERMARK value in a shift register so that at least three consecutive WATERMARK values are stored at all times;

incrementing the WRITE value on each WRITE pulse and storing said incremented WRITE value;

continuously comparing the incremented WRITE value and the WATERMARK values stored in said shift register; and generating a partial capacity status flag when said comparison indicates a predetermined historical trend of change in said compared incremented WRITE values and said WATERMARK values stored in said shift register.

6. A method as set forth in claim 5, wherein said WATERMARK value comprises a value at which said memory is considered to be in an ALMOST FULL state.

7. A method as set forth in claim 5, wherein said WATERMARK value comprises a value at which said memory is considered to be in an ALMOST EMPTY state.

8. A method as set forth in claim 5, wherein said WATERMARK value comprises a value at which said memory is considered to be in a HALF FULL state.

9. The method as a set forth in claim 5, wherein said WATERMARK and WRITE values are generated in gray code.

10. A gray-code flag generator, comprising:
- a WRITE pointer, said WRITE pointer comprising at least:
  - a WRITE pointer register; and
  - a gray-code increment block adapted to receive an output from said WRITE pointer register;
- a READ pointer, said READ pointer comprising at least:
  - a plurality of READ pointer registers configured as a shift register, each of said plurality of READ pointer registers having an output; and
  - a gray-code increment block adapted to receive an output from one of said plurality of READ pointer registers and having an output that is coupled to an input of said one of said plurality of READ pointer registers;
- a comparator having plural outputs and adapted to receive and compare signals output from said WRITE pointer and said READ pointer and comparing the values of said signals; and
- a flag generator outputting capacity status flags based on the comparisons made by said comparator.

11. An apparatus for generating capacity status flags in a memory adapted to receive READ and WRITE pulses and to store a WRITE value based on the received WRITE pulse, comprising:
- means for setting a WATERMARK value at which point said memory is considered to be in a partial capacity state;
- means for incrementing the WATERMARK value on each READ pulse and storing the incremented WATERMARK value in a shift register so that at least three consecutive WATERMARK values are stored at all times;
- means for incrementing the WRITE value on each WRITE pulse and storing said incremented WRITE value;
- means for continuously comparing the incremented WRITE value and the WATERMARK values stored in said shift register; and
- means for generating a partial capacity status flag when said comparison indicates a predetermined historical trend of change in said compared incremented WRITE values and said WATERMARK values stored in said shift register.

* * * * *